United States Patent
Brooker et al.

(10) Patent No.: US 8,918,617 B2
(45) Date of Patent: Dec. 23, 2014

(54) DEFRAGMENTATION OF STORAGE CLASS MEMORY MANAGED IN EXTENTS

(75) Inventors: Christopher G. Brooker, New Paltz, NY (US); Alfred F. Foster, Wappingers Falls, NY (US); Charles E. Mari, Wappingers Falls, NY (US); Robert Miller, Jr., Poughkeepsie, NY (US); Harris M. Morgenstern, Poughkeepsie, NY (US); Walter W. Otto, Poughkeepsie, NY (US); Steven M. Partlow, Beacon, NY (US); Thomas F. Rankin, Wallkill, NY (US); Scott B. Tuttle, Staatsburg, NY (US); Elpida Tzortzatos, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 13/616,410

(22) Filed: Sep. 14, 2012

(65) Prior Publication Data
US 2014/0082317 A1    Mar. 20, 2014

(51) Int. Cl.
*G06F 12/00* (2006.01)

(52) U.S. Cl.
USPC ............................ 711/170; 711/165; 711/171

(58) Field of Classification Search
CPC . G06F 12/023; G06F 12/0284; G06F 3/0604; H04N 21/4335
USPC .......................................... 711/165, 170, 171
See application file for complete search history.

(56) References Cited

U.S. PATENT DOCUMENTS

| | | | |
|---|---|---|---|
| 6,470,436 B1 * | 10/2002 | Croft et al. .................... | 711/206 |
| 2007/0136385 A1 * | 6/2007 | Abrashkevich et al. ...... | 707/200 |
| 2007/0143566 A1 | 6/2007 | Gorobets | |
| 2007/0226445 A1 * | 9/2007 | Nichols et al. ................ | 711/170 |
| 2008/0010395 A1 | 1/2008 | Mylly et al. | |
| 2009/0150633 A1 * | 6/2009 | Lee et al. ...................... | 711/165 |
| 2011/0107011 A1 | 5/2011 | Russo et al. | |
| 2012/0303889 A1 * | 11/2012 | Coker et al. .................. | 711/113 |

* cited by examiner

*Primary Examiner* — John Lane
(74) *Attorney, Agent, or Firm* — Cantor Colburn LLP; William A. Kinnaman, Jr.

(57) ABSTRACT

Embodiments relate to methods, systems and computer program products for defragmenting storage class memory by comparing a utilization rate of the storage class memory to a threshold value. If the utilization rate of the storage class memory is greater than the threshold value, the potentially wasted storage space is then compared to the combined storage capacity of the unclaimed extents of the storage class memory. If the potentially wasted storage space is greater than the combined storage capacity of the unclaimed extents of the storage class memory, a determination is made whether a defragmentation was recently performed. Based on determining that the defragmentation was not recently performed, or that it was recently performed and was productive, performing a defragmentation of the storage class memory.

20 Claims, 4 Drawing Sheets

DEFRAGMENTATION OF STORAGE CLASS MEMORY MANAGED IN EXTENTS

BACKGROUND

The present invention relates generally to management of memory resources, and more specifically, to the defragmentation of a storage class memory managed in extents.

A computing environment may include main memory, as well as auxiliary storage, such as direct access storage devices (DASD) or flash memory. Main memory includes pages of memory that are backed by real storage, referred to as real storage frames. These pages are ready to be accessed by applications, instructions, operations, or other entities. Main memory is limited in space, and therefore typically only the most recently used pages of memory are maintained in main memory. The other pages of memory are maintained in auxiliary storage.

Auxiliary storage may include blocks of storage that are read and written. These blocks of storage are managed by an auxiliary storage manager, including the allocation/deallocation of the blocks. In one example, the auxiliary storage manager tracks which blocks are currently being used and by what system components. To facilitate managing the blocks of storage, a portion of the auxiliary storage, such as the storage class memory, may be separated into extents, where an extent is a range of storage. The extents may be configured to be used with a single size block of storage or for a mix of multiple sizes of blocks of storage. For instance, one extent may be configured for storing 4 kilobyte blocks, another extent may be configured for storing 1 megabyte blocks and another extent may be configured to store both sizes of blocks.

While using extents to manage blocks of storage class memory has advantages, the use of extents can lead to the storage class memory becoming fragmented and inefficient use of the auxiliary storage space. Fragmentation can necessitate demotion of 1M blocks in to 4K blocks which can lead to system performance degradation.

SUMMARY

Embodiments include a computer system for defragmenting a storage class memory, the system includes a real storage manager configured to control a real memory and an auxiliary storage manager in communication with the real storage manager. The auxiliary storage manager is configured to control the storage class memory having includes a plurality of extents. The system configured to perform a method that includes determining whether a utilization rate of the storage class memory is greater than a threshold value. Based on determining that the utilization rate of the storage class memory is greater than the threshold value, the method includes determining whether a potentially wasted storage space is greater than a combined storage capacity of one or more unclaimed extents of the storage class memory. Based on determining that the potentially wasted storage space is greater than the combined storage capacity of one or more unclaimed extents of the storage class memory, the method includes determining whether a defragmentation was recently performed. Based on determining that the defragmentation was not recently performed, the method further includes defragmenting the storage class memory.

Embodiments include also include a computer implemented method for defragmenting a storage class memory. The method includes determining whether a utilization rate of the storage class memory is greater than a threshold value. Based on determining that the utilization rate of the storage class memory is greater than the threshold value, the method includes determining whether a potentially wasted storage space is greater than a combined storage capacity of one or more unclaimed extents of the storage class memory. Based on determining that the potentially wasted storage space is greater than the combined storage capacity of one or more unclaimed extents of the storage class memory, the method includes determining whether a defragmentation was recently performed. Based on determining that the defragmentation was not recently performed, the method further includes defragmenting the storage class memory.

Embodiments also include a computer program product for defragmenting a storage class memory, the computer program product having a tangible storage medium readable by a processing circuit and storing instructions for execution by the processing circuit for performing a method. The method includes determining whether a utilization rate of the storage class memory is greater than a threshold value. Based on determining that the utilization rate of the storage class memory is greater than the threshold value, the method includes determining whether a potentially wasted storage space is greater than a combined storage capacity of one or more unclaimed extents of the storage class memory. Based on determining that the potentially wasted storage space is greater than the combined storage capacity of one or more unclaimed extents of the storage class memory, the method includes determining whether a defragmentation was recently performed. Based on determining that the defragmentation was not recently performed, the method further includes defragmenting the storage class memory.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

In exemplary embodiments, defragmentation of a storage class memory includes determining if the storage class memory is fragmented using usage metrics of the storage class memory. In exemplary embodiments, if storage class memory is fragmented then each used storage class memory block is evaluated whether it should be moved. In exemplary embodiments, the method for determining whether a storage class memory should be defragmented does not require inspecting all bitmaps associated with the extents of the storage class memory and can therefore quickly detect fragmentation.

Figure 1:
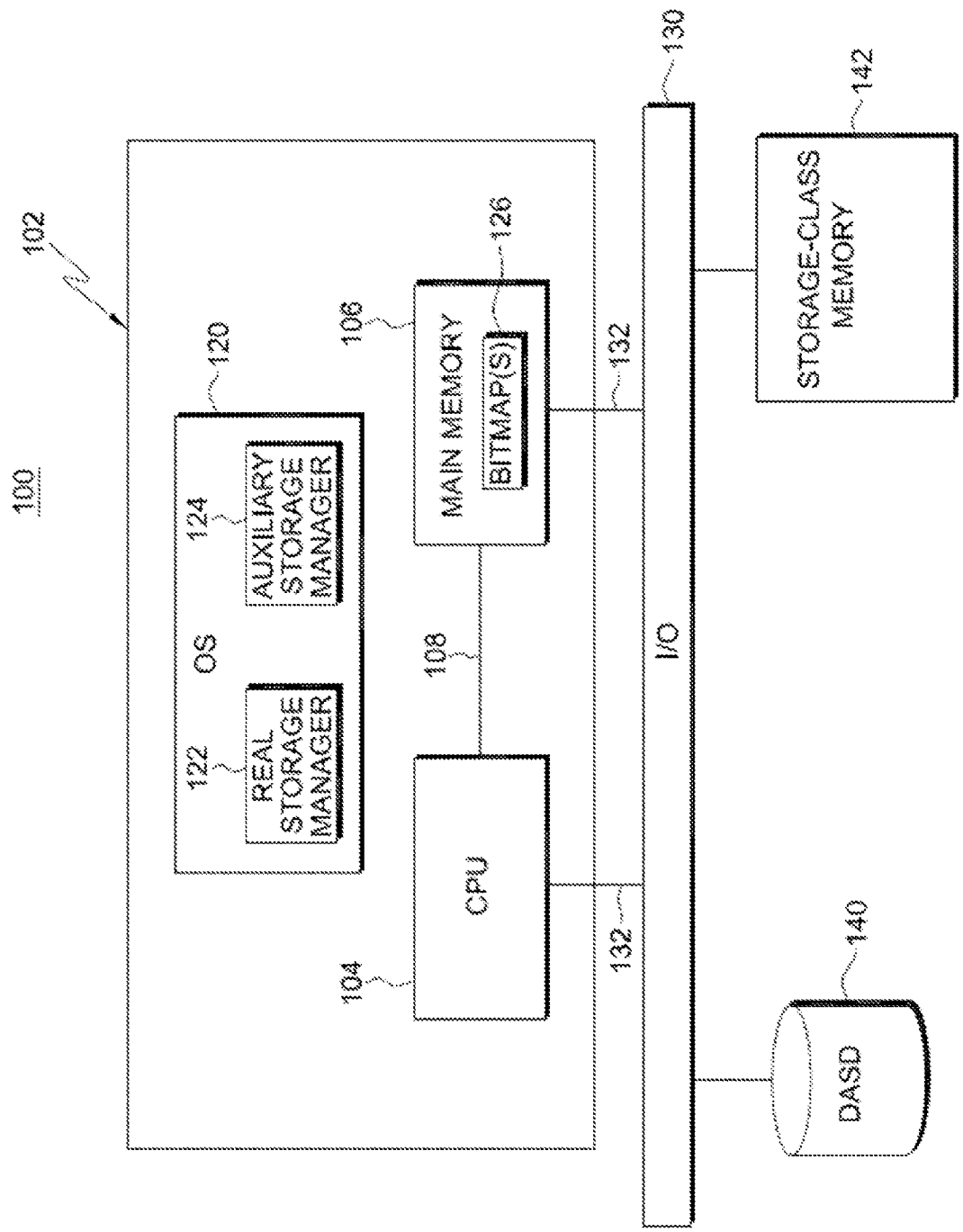
FIG. 1 depicts a block diagram of a system for management of storage class memory in accordance with an exemplary embodiment.

Referring now to FIG. 1, an embodiment of a computing environment to incorporate and/or use one or more aspects of the present invention is shown. In exemplary embodiments, computing environment 100 includes a system 102, such as one or more servers, a central processing complex, etc., that includes, for instance, one or more central processing units (CPUs) 104 coupled to main memory 106 via one or more buses 108. One of the central processing units 104 may execute an operating system 120, such as the z/OS® operating system offered by International Business Machines Corporation. In other examples, one or more of the central processing units may execute other operating systems or no operating system. z/OS® is a registered trademark of International Business Machines Corporation, Armonk, N.Y., USA.

Central processing unit(s) 104 and main memory 106 are further coupled to an I/O subsystem 130 via one or more connections 132 (e.g., buses or other connections). The I/O subsystem 130 provides connectivity to one or more auxiliary storage media, including, for instance, one or more direct access storage devices (DASD) 140 and storage class memory 142 (e.g., flash memory). In one particular example of the z/Architecture®, the I/O subsystem 130 is a channel subsystem. However, the I/O subsystem 130 may be a subsystem other than a channel subsystem, and the auxiliary storage media may be media other than or in addition to DASD 140 and storage class memory 142.

Main memory 160 and auxiliary storage are managed, in one example, by managers of operating system 120, including, for instance, a real storage manager 122 and an auxiliary storage manager 124. Real storage manager 122 is responsible for tracking the contents of main memory 160 and managing the paging activities of main memory. Auxiliary storage manager 124 is responsible for tracking auxiliary storage, including DASD 140 and storage class memory 142, and for working with the real storage manager 122 to find locations to store pages that are being evicted from main memory 106.

The auxiliary storage manager 124 manages various types of auxiliary storage, including storage class memory 142, such as flash memory. In one embodiment, storage class memory 142 is read or written in varying storage block sizes, including 4K and 1M storage blocks, as examples. The operating system (e.g., auxiliary storage manager 124) keeps track of the blocks currently being used and by which system component.

Figure 2:
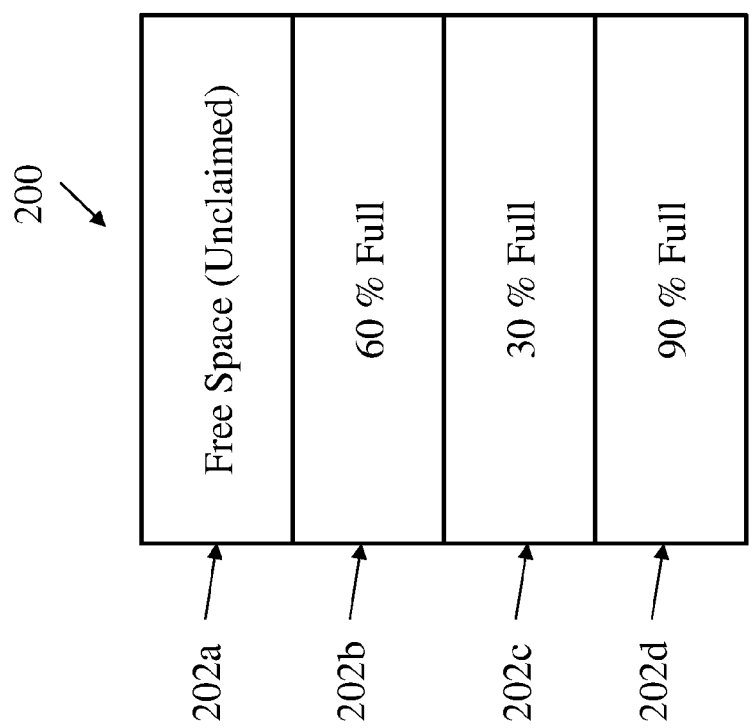
FIG. 2 depicts a block diagram of a storage class memory having a plurality of extents in accordance with an exemplary embodiment.

To facilitate managing the blocks of storage, in one example, the storage class memory 142 is separated into extents (such as in FIG. 2). An extent is a range of the storage class memory 142. For instance, at start-up (e.g., IPL or boot), a size (e.g., 1 gigabyte) is selected, and the storage class memory 142 is logically subdivided by the size creating the extents.

In exemplary embodiments, an extent can be one of four types: (1) empty in which all blocks are available; (2) 4K in which it only includes 4K blocks of storage; (3) 1M in which it only includes 1M blocks of storage; and (4) mixed in which it includes a variety of block sizes, including in this example, 4K and 1M blocks of storage. In other examples, the blocks may be other than 4K or 1M, and the mixed type may include more than two block sizes. Further, there may be other types of extents. Associated with each extent is an indication of the type of extent, a count of the number of free blocks and a bitmap 126 which indicates the blocks that are allocated (a.k.a., obtained, in use), as described below.

Within an extent, blocks of storage may be allocated or freed. When the last allocated block of an extent is freed, the extent's type is dynamically changed to empty. Additionally, if a 4K block is freed from an extent of type 1M, such as when a 1M block is demoted (as described below), then the extent type is dynamically changed to mixed. As yet another example, if a 1M block is demoted, the extent type is dynamically changed to mixed.

In one example, to demote a large page (e.g., 1M page) to a plurality of small pages (e.g., 4K pages), control blocks associated with the large page are changed. For example, a 1M page has 256 contiguous 4K pages, and each 4K page has associated therewith a control block (e.g., page frame table entry). Within each control block is an identifier (e.g., QID) that specifies the type of page. Thus, to demote the 1M page to 256 4K pages, the QID of each of the 256 control blocks is changed from an identifier specifying a 1M page to an identifier specifying a 4K page.

In one example, to manage usage of storage in an extent, a bitmap 126 is used. Each extent has its own bitmap, and bitmap 126 includes, for instance, a bit for each 4K block of storage in the extent. When a 4K block is obtained, the bit corresponding to that block is set; if it is a 1M block that is obtained, 256 bits corresponding thereto are set.

Referring now to FIG. 2, a block diagram of a storage class memory 200 having a plurality of extents 202a-202d in accordance with an exemplary embodiment is shown. As shown, the storage class memory 200 includes four extents 202a-202d, which are each the same size. For example, if the storage class memory 200 has a 4 gigabyte capacity, each of the four extents 202a-202d has a 1 gigabyte capacity. As shown, the first extent 202a is unclaimed and the other three extents 202b-202d have each been claimed. An extent is considered claimed if it has any allocated blocks. Unclaimed extents are completely free and could be configured to hold either 4K or 1M blocks, or both in the case of mixed extents. In exemplary embodiments, the utilization rate of the storage class memory 200 is the percentage of the extents that are claimed. In the illustrated example, the utilization rate of the storage class memory 200 is 75%.

In exemplary embodiments, each of the claimed extents 202b-202d includes an extent utilization rate, which indicates the percentage of the extent that is being used. In the example shown, the second extent 202b has an extent utilization rate of 60%, the third extent 202c has an extent utilization rate of 30% and the fourth extent 202d has an extent utilization rate of 90%. The amount of utilized capacity of the storage class memory 200 is the sum of the utilized space of each extent 202a-202d, which is 1.8 (0.6+0.3+0.9) gigabytes. In exemplary embodiments, the potentially wasted storage space is the amount of claimed but unused storage, in the example illustrated 1.2 gigabytes (3.0 claimed−1.8 used). In exemplary embodiments, the unused storage space is the sum of the potentially wasted storage space and the unclaimed space, in the example illustrated 2.2 gigabytes (1.0 unclaimed+1.2 potentially wasted). The utilization rate, the extent utilization rate, the potentially wasted storage space and the unused storage space are collectively referred to herein as usage metrics.

In exemplary embodiments, when a new block of storage class memory is obtained by the auxiliary storage manager, the storage class memory may be checked for fragmentation.

In exemplary embodiments, the auxiliary storage manager uses one or more usage metrics described above with reference to FIG. 2 to estimate the amount of fragmentation in the storage class memory rather than scanning all bitmaps associated with the storage class memory to find fragmentation.

Figure 3:
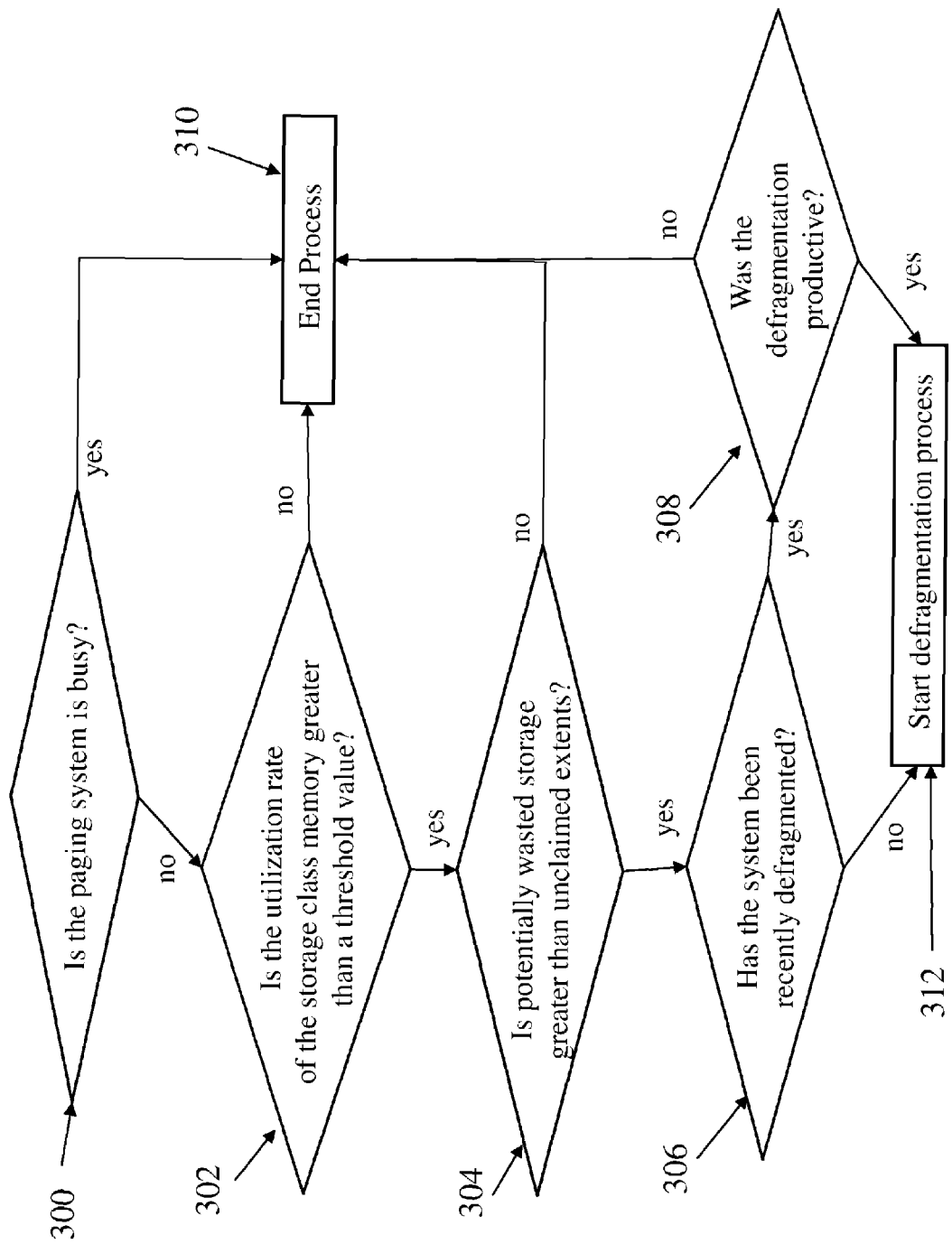
FIG. 3 depicts a process flow for a method of determining whether to defragment a storage class memory in accordance with exemplary embodiment.

Referring now to FIG. 3, a process flow for a method of determining whether to defragment a storage class memory in accordance with exemplary embodiment is shown. First, as shown at block 300, the method includes determining if the paging system is busy. If the paging system is busy, the method proceeds to block 310 and the defragmentation process is not performed. Otherwise, the method proceeds to block 302 and a determination is made if the utilization rate of the storage class memory is greater than a threshold value. In one example, the threshold value may be 70%. If the utilization rate is less than the threshold value, the method proceeds to block 310 and the defragmentation process is not performed. Otherwise, the method proceeds to block 304 and a determination is made if the potentially wasted storage space is greater than the combined capacity of the unclaimed extents. If the potentially wasted storage space is less than the combined capacity of the unclaimed extents, the method proceeds to block 310 and the defragmentation process is not performed. Otherwise, the method proceeds to block 306 and a determination is made if a defragmentation process has recently been completed. In one example, a threshold time period, such as two minutes, can be used to determine if a defragmentation process has recently been completed. If there was no recent defragment, the method proceeds to block 312 and a defragmentation process is started. Otherwise, the method proceeds to block 308 and a determination is made if the recent defragmentation process was productive. For example, this can be done by comparing the amount of potentially wasted storage space before and after the previous defragmentation process. If the recent defragmentation process was productive, the method proceeds to block 312 and a defragmentation process is started. Otherwise, the method proceeds to block 310 and the defragmentation process is not performed. In exemplary embodiments, this feedback loop allows for frequent defragmentation only if they are productive.

In exemplary embodiments, once it is determined that the storage class memory should be defragmented, the defragment processing may utilize a process similar to evacuation processing used by storage class memory offline processing to defragment the storage class memory. A process for evacuation processing used by storage class memory offline processing is described in more detail in U.S. patent application Ser. No. 13/616,405, entitled STORAGE CLASS MEMORY EVACUATION, which was filed concurrently herewith, the contents of which are hereby incorporated by reference.

Figure 4:
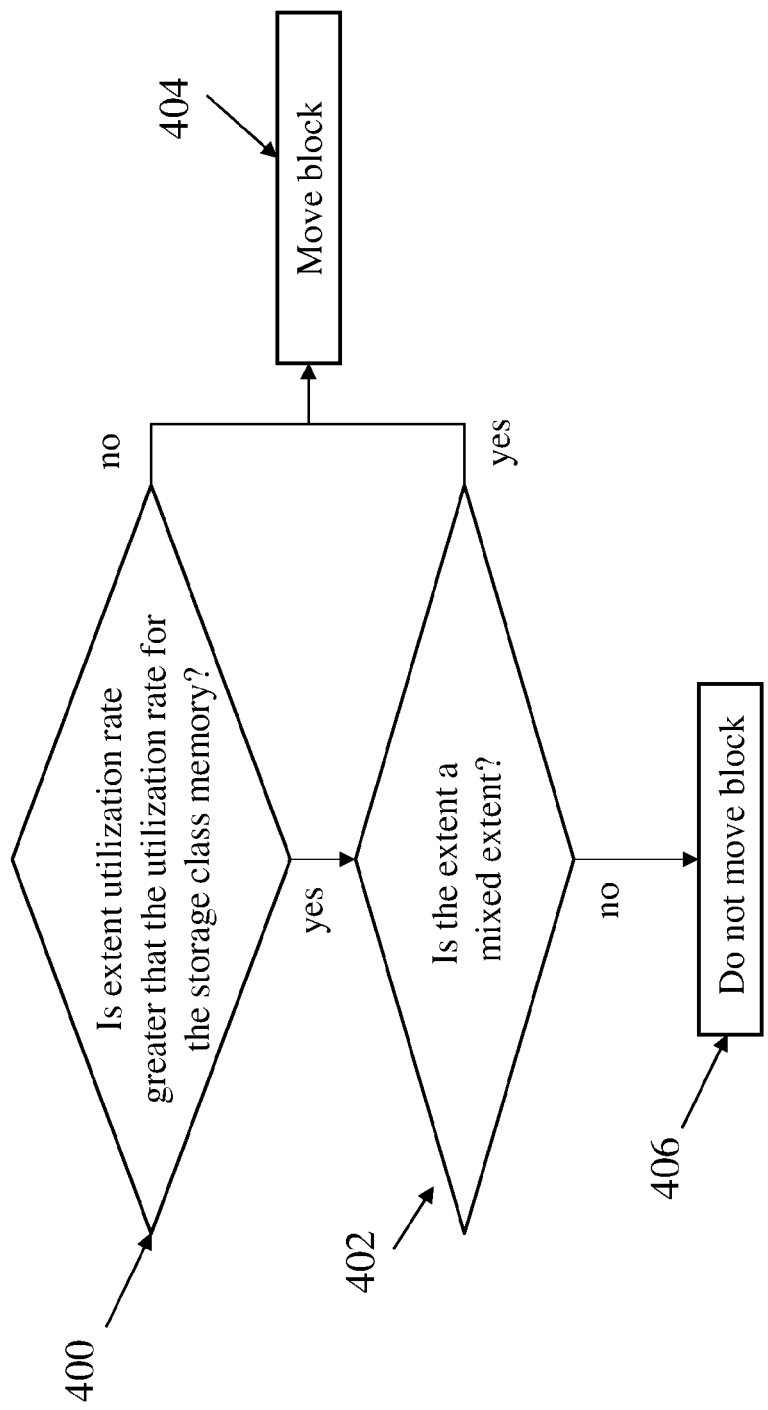
FIG. 4 depicts a process flow for a method of determining whether to move a block of a storage class memory during a defragmentation process in accordance with exemplary embodiment.

Referring now to FIG. 4, a process flow for a method of determining whether to move a block of a storage class memory during a defragmentation process in accordance with exemplary embodiment is shown. As shown at block 400, the method includes determining if the extent utilization rate for the extent that the storage block is associated with is greater than the utilization rate for the storage class memory device. If the extent utilization rate is not greater than the utilization rate for the storage class memory device, the method proceeds to block 404 and the storage block is moved to another extent. Otherwise, the method proceeds to block 402 and a determination is made if the extent containing the storage block is a mixed extent. If the storage block is in a mixed extent, the method proceeds to block 404 and the storage block is moved to another extent. Otherwise, the method proceeds to block 406 and the storage block is not moved. In exemplary embodiments, mixed extents are only filled after the non-mixed extents are filled and the defragmentation process is configured to empty the mixed extents even if the extent utilization rate is greater than the utilization rate for the storage class memory.

In exemplary embodiments, when the evacuation process pages in the data from storage class memory it will obtain a new block for the page out. Because block allocations are made from a single extent until it is filled, this will naturally tend to compress the storage class memory into the minimum number of extents.

In exemplary embodiments, the method for determining whether a storage class memory should be defragmented does not require inspecting all bitmaps associated with the extents of the storage class memory and can therefore quickly detect fragmentation. In exemplary embodiments, the method for determining whether a storage class memory is system initiated and does not require the user to initiate analysis and defragmentation. In exemplary embodiments, as the storage class memory becomes constrained the determination whether to start defragmentation and whether to move each block both become more aggressive.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for defragmenting a storage class memory, the system comprising:
   a real storage manager configured to control a real memory;
   an auxiliary storage manager in communication with the real storage manager, the auxiliary storage manager configured to control the storage class memory, the storage class memory including a plurality of extents, the system configured to perform a method comprising:
   determining whether a utilization rate of the storage class memory is greater than a threshold value;
   based on determining that the utilization rate of the storage class memory is greater than the threshold value, determining whether a potentially wasted storage space is greater than a combined storage capacity of the unclaimed extents of the storage class memory;
   based on determining that the potentially wasted storage space is greater than the combined storage capacity of the unclaimed extents of the storage class memory, determining whether a defragmentation was recently performed; and
   based on determining that the defragmentation was not recently performed, defragmenting the storage class memory.

2. The computer system of claim 1, further comprising:
   based on determining that the defragmentation was recently performed, determining if the defragmentation was productive; and
   based on determining that the defragmentation was productive, defragmenting the storage class memory.

3. The computer system of claim 2, wherein determining that the defragmentation was recently performed comprises determining if a defragmentation process was performed within a threshold time period.

4. The computer system of claim 1, wherein defragmenting the storage class memory comprises:
   comparing an extent utilization rate for one of the plurality of extents associated with a block of storage to the utilization rate of the storage class memory; and based upon determining that the extent utilization rate for the one of the plurality of extents associated with the block of storage is not greater than the utilization rate of the storage class memory, moving the block of storage to another of the plurality of extents.

5. The computer system of claim 4, wherein defragmenting the storage class memory further comprises:
based upon determining that the extent utilization rate for the one of the plurality of extents associated with the block of storage is less than the utilization rate of the storage class memory, determining if the one of the plurality of extents is a mixed extent; and
based upon determining that the one of the plurality of extents is a mixed extent, moving the block of storage to another of the plurality of extents.

6. The computer system of claim 1, wherein the potentially wasted storage space is a combined amount of claimed but unused space in the plurality of extents.

7. The computer system of claim 1, wherein the utilization rate of the storage class memory is a percentage of the plurality of extents that have been claimed.

8. A computer implemented method for defragmenting a storage class memory, the method comprising:
determining, by a processor, whether a utilization rate of the storage class memory is greater than a threshold value, wherein the storage class memory comprises a plurality of extents;
based on determining that the utilization rate of the storage class memory is greater than the threshold value, determining whether a potentially wasted storage space is greater than a combined storage capacity of the unclaimed extents of the storage class memory;
based on determining that the potentially wasted storage space is greater than the combined storage capacity of the unclaimed extents of the storage class memory, determining whether a defragmentation was recently performed; and
based on determining that the defragmentation was not recently performed, defragmenting the storage class memory.

9. The computer implemented method of claim 8, further comprising:
based on determining that the defragmentation was recently performed, determining if the defragmentation was productive; and
based on determining that the defragmentation was productive, defragmenting the storage class memory.

10. The computer implemented method of claim 9, wherein determining that the defragmentation was recently performed comprises determining if a defragmentation process was performed within a threshold time period.

11. The computer implemented method of claim 8, wherein defragmenting the storage class memory comprises:
comparing an extent utilization rate for one of the plurality of extents associated with a block of storage to the utilization rate of the storage class memory; and
based upon determining that the extent utilization rate for the one of the plurality of extents associated with the block of storage is not greater than the utilization rate of the storage class memory, moving the block of storage to another of the plurality of extents.

12. The computer implemented method of claim 11, wherein defragmenting the storage class memory further comprises:
based upon determining that the extent utilization rate for the one of the plurality of extents associated with the block of storage is less than the utilization rate of the storage class memory, determining if the one of the plurality of extents is a mixed extent; and
based upon determining that the one of the plurality of extents is a mixed extent, moving the block of storage to another of the plurality of extents.

13. The computer implemented method of claim 8, wherein the potentially wasted storage space is a combined amount of claimed but unused space in the plurality of extents.

14. The computer implemented method of claim 8, wherein the utilization rate of the storage class memory is a percentage of the plurality of extents that have been claimed.

15. A computer program product for defragmenting a storage class memory, the computer program product comprising:
a non-transitory computer readable storage medium storing instructions for execution by a processing circuit for performing a method comprising:
determining, by a processor, whether a utilization rate of the storage class memory is greater than a threshold value, wherein the storage class memory comprises a plurality of extents;
based on determining that the utilization rate of the storage class memory is greater than the threshold value, determining whether a potentially wasted storage space is greater than a combined storage capacity of the unclaimed extents of the storage class memory;
based on determining that the potentially wasted storage space is greater than the combined storage capacity of the unclaimed extents of the storage class memory, determining whether a defragmentation was recently performed; and
based on determining that the defragmentation was not recently performed, defragmenting the storage class memory.

16. The computer program product of claim 15, further comprising:
based on determining that the defragmentation was recently performed, determining if the defragmentation was productive; and
based on determining that the defragmentation was productive, defragmenting the storage class memory.

17. The computer program product of claim 16, wherein determining that the defragmentation was recently performed comprises determining if a defragmentation process was performed within a threshold time period.

18. The computer program product of claim 15, wherein defragmenting the storage class memory comprises:
comparing an extent utilization rate for one of the plurality of extents associated with a block of storage to the utilization rate of the storage class memory; and
based upon determining that the extent utilization rate for the one of the plurality of extents associated with the block of storage is not greater than the utilization rate of the storage class memory, moving the block of storage to another of the plurality of extents.

19. The computer program product of claim 18, wherein defragmenting the storage class memory further comprises:
based upon determining that the extent utilization rate for the one of the plurality of extents associated with the block of storage is less than the utilization rate of the storage class memory, determining if the one of the plurality of extents is a mixed extent; and
based upon determining that the one of the plurality of extents is a mixed extent, moving the block of storage to another of the plurality of extents.

20. The computer program product of claim 15, wherein the potentially wasted storage space is a combined amount of claimed but unused space in the plurality of extents and the utilization rate of the storage class memory is a percentage of the plurality of extents that have been claimed.

\* \* \* \* \*